United States Patent [19]
Frazier

[11] Patent Number: 5,345,240
[45] Date of Patent: Sep. 6, 1994

[54] HANDHELD OBSTACLE PENETRATING MOTION DETECTING RADAR

[75] Inventor: Lawrence M. Frazier, West Covina, Calif.

[73] Assignee: Hughes Missile Systems Company, Los Angeles, Calif.

[21] Appl. No.: 102,161

[22] Filed: Aug. 4, 1993

[51] Int. Cl.⁵ ............................................. G01S 13/56
[52] U.S. Cl. ......................................... 342/28; 342/22
[58] Field of Search ............................ 342/28, 160, 22

[56] References Cited

U.S. PATENT DOCUMENTS 4,608,566 8/1986 Ennis et al. ............................ 342/22
4,961,039 10/1990 Yamauchi et al. ................ 342/28 X

*Primary Examiner*—Mark Hellner
*Attorney, Agent, or Firm*—Charles D. Brown; Randall M. Heald; Wanda K. Lenson-Low

[57] ABSTRACT

A motion detection radar system comprised of a low power frequency tunable continuous wave transmitter and antenna, a receiver, an FM transmitter and antenna, and a handheld remote FM receiver. The radar system may be adapted to operate at any frequency from 600 MHz to 1.2 GHz. The motion detecting radar system uses a technique for measuring the changes in phase difference and the rate of change of phase differences detected thereby. The receiver captures the total energy reflected from all reflective objects within the antenna field of view and compares that signal with the transmitted signal in a mixer. If all objects are stationary and the radar system is stationary, the total complex phase pattern of the return signal is constant, and a fixed DC output signal is provided from the mixer. Any motion within the field of view changes the fixed phase relationship and causes a phase rate of change at the receiver output. The phase rate of change is converted into a tone which allows an operator to recognize object motion. The tone is transmitted by the FM transmitter to the remote FM receiver used by the operator to monitor monitor object motion. The receiver output is almost inaudible when there are no moving objects, but an alarm tone is provided when object motion is present. The detection process used in the motion detecting radar is unique in that it captures minute changes in the complex signal from all reflectors and converts the moving object differences into the audible alarm.

7 Claims, 1 Drawing Sheet

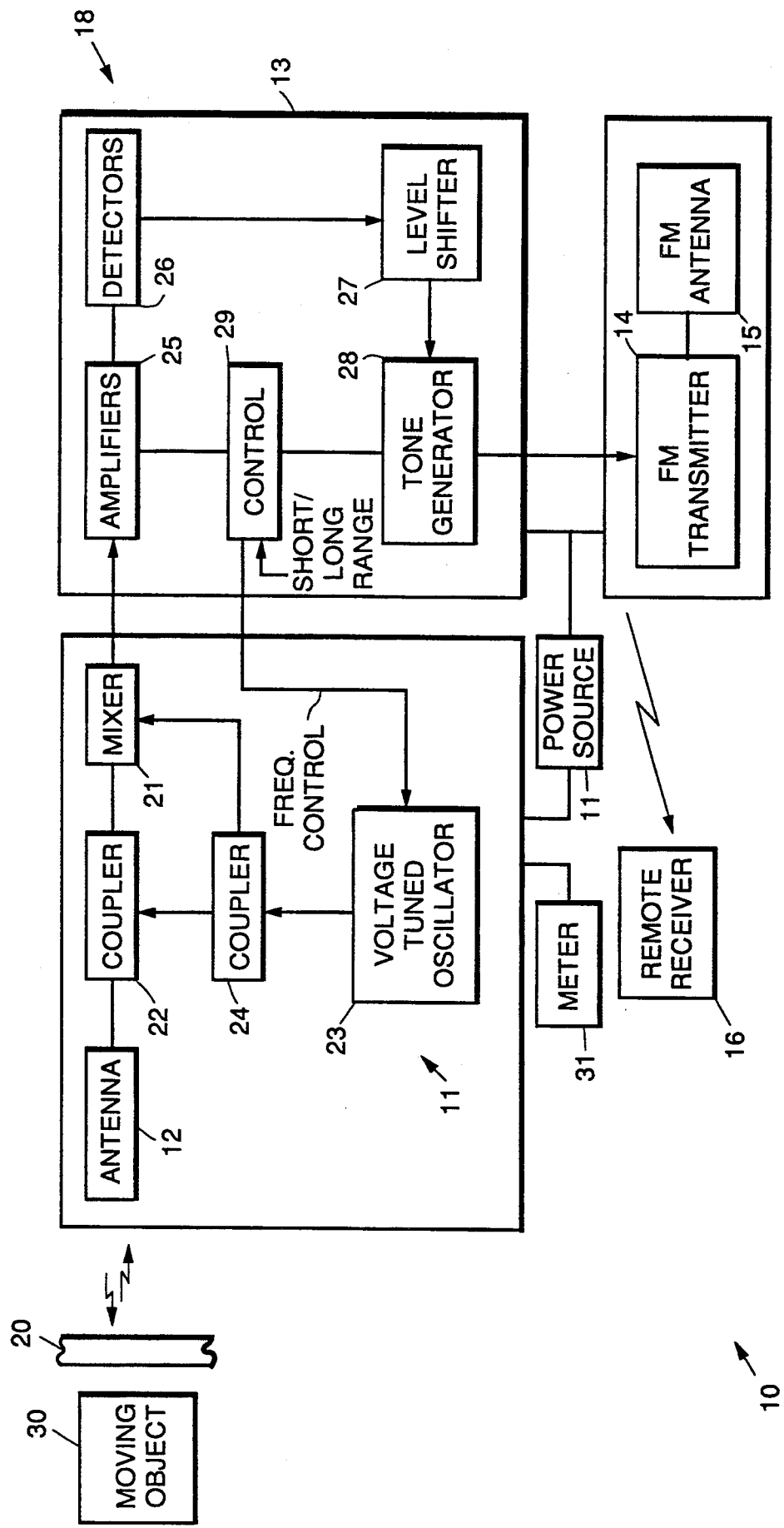

HANDHELD OBSTACLE PENETRATING MOTION DETECTING RADAR

BACKGROUND

The present invention relates generally to radars, and more particularly, to a motion detection radar system that is adapted to produce radar warnings signals regarding the presence of moving objects that are located behind structural barriers, and the like.

Law enforcement agencies have an urgent need for a low cost, easily portable, system for detecting the presence of people inside buildings or behind walls where the subjects cannot be seen. The system must have the capability to penetrate most common building materials such as wood, stucco and concrete. It is also necessary for the system to penetrate bushes, shrubs, and other foliage. It must provide a positive indication of people moving at distances of at least 20 feet on the other side of the barrier. It must be able to look through both common floors and ceilings. The system must be battery operated and provide for remote, wire free operation.

A number of different types of radars have been developed that can detect the motion of a person in a clear environment. Most of these radars are doppler radars. A doppler radar measures the motion of a object in terms of the difference in frequency of the received radar signal as compared to the frequency of the transmitted radar signal. The motion of the object causes this change in frequency in the same way that the sound of the whistle of a passing train changes. The doppler frequency difference is equal to two times the speed of the object (toward or away from the radar) times the operating frequency of the radar divided by the speed of transmission (983,57 1,000 feet per second). Thus, as the radar frequency is increased, so does the doppler frequency for the same speed object.

A radar operating at 983.571 MHz, for example, would produce a 2 Hz doppler frequency for a object motion of 1 foot per second, (2×1 ft/sec ×1 Hz/f/sec =2 Hz). Consequently, for motion less than 1 ft/sec, it is necessary to measure phase difference rather than frequency difference because the doppler frequency is so low. Therefore, for slow moving object situations, doppler radar is not the optimally adapted for use in this application.

Accordingly, it is an objective of the present invention to provide for a motion detection radar system that is adapted to produce radar warnings signals regarding the presence of moving objects that are located behind structural barriers, and the like.

SUMMARY OF THE INVENTION

A system that meets the requirements outlined in the Background section is a motion detection radar system constructed in accordance with the principles of the present invention. The motion detecting radar system is comprised of a low power frequency tunable continuous wave (CW) transmitter and antenna, a receiver, an FM transmitter and antenna, and a handheld remote FM receiver. The radar system may be adapted to operate at any frequency from 600 MHz to 1.2 GHz.

The motion detecting radar system of the present invention uses a unique technique for measuring the changes in phase difference and the rate of change of phase differences. The receiver captures the total energy reflected from all reflective objects within the antenna field of view and compares that signal with the transmitted signal in a mixer in the receiver. If all objects are stationary and the radar system is stationary, the total complex phase pattern of the return signal is constant, and a fixed DC output is provided from the mixer. Any motion within the field of view changes the fixed phase relationship and causes a phase rate of change at the output of the receiver. High gain AC amplifiers in the receiver amplify these minute DC changes to provide usable signals.

More particularly, the phase rate of change is converted into a tone that allows an operator to recognize motion of an object. The tone is transmitted by the FM transmitter to the remote FM receiver used by the operator to monitor monitor object motion. The receiver output is almost inaudible when there are no moving objects, but an alarm tone is provided when object motion is present. The detection process used in the motion detecting radar is unique in that it captures minute changes in the complex signal from all reflectors and converts the moving object differences into the audible alarm.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole FIGURE of the drawing is a block diagram of a concrete penetrating motion detecting radar in accordance with the principles of the present invention.

DETAILED DESCRIPTION

A number of tests have been conducted on different nonmetallic materials to determine their transmission and reflectance characteristics as a function of frequency and other associated parameters. It has been determined that acceptable loss values (less than 10 dB two-way) may be obtained for common building materials such as wood, stucco and concrete (including 6 inch reinforced concrete walls) when the radar frequency is reduced to below 1 GHz. It has further been found that the reflectivity of the human body is relatively constant at frequencies above 500 MHz. Thus, it has been determined that a radar system operating within the band of 500 MHz to 1 GHz can meet the requirements for penetration through these common building materials with a good probability of detecting a moving body on the other side of the material.

Referring to the drawing FIGURE, it is a block diagram of a motion detecting radar system 10 in accordance with the principles of the present invention that is adapted to detect moving objects 30 obscured by structures 20 comprised of common building materials such as wood, stucco and concrete. The motion detecting radar system 10 is comprised of a low power frequency tunable continuous wave (CW) transmitter 11 and CW antenna 12, a receiver 13, an FM transmitter 14 and FM antenna 15, a handheld remote FM receiver 16 employed by an operator, and a power source 17 such as is provided by a Nicad battery, for example. All components of the motion detecting radar system 10 are housed inside a three-inch thick briefcase (not shown). The CW transmitter 11 is adapted to transmit less than 2 milliwatts of radiated power. The motion detecting radar system 10 may be adapted to operate at any frequency from 600 MHz to 1.2 GHz.

The CW antenna 12 is coupled to a first input port of a phase sensitive mixer 21 by way of a first three-port coupler 22. A voltage tuned oscillator 23 is coupled by way of a second three-port coupler 24 to a second input port of the first three-port coupler 22 and to a second input port of the phase sensitive mixer 21. The output of the phase sensitive mixer 21 is coupled to the receiver 13.

The CW antenna 12 is a single element, wide band tapered transmission line that has approximately 10 dB forward gain across the entire operating frequency range of the motion detecting radar system 10. The CW antenna 12 has an approximate ±45 degree, (−6 dB two way) beam width in both planes. The CW antenna 12 has a front-to-back ratio of better than 10 dB. These antenna characteristics provide adequate gain and front-to-back characteristics for most operations as long as the operator is not too close to the motion detecting radar system 10 while it is operated in the high sensitivity mode.

The receiver 13 is comprised of a signal processor 18 that includes amplifiers 25, detectors 26, a level shifter 27 and a tone generator 28. Outputs of the amplifiers 25 are coupled through the detectors 26 and the level shifter 27 to the tone generator 28. A controller 29 is coupled to the amplifier 25 and tone generator 26 of the signal processor 18 and to the voltage tuned oscillator 23 in the transmitter 11. The output of the tone generator 28 is coupled by way of the low power FM transmitter 14 to the FM antenna 15 which transmits tones generated by the tone generator 28 to the remote handheld FM receiver 16 that is held by the operator.

The motion detecting radar system 10 is housed inside a three inch thick briefcase, and weighs less than 8 pounds. It may be battery operated and can operate for more than 4 hours from a single battery charging. The low power FM transmitter 14 (operating at 49 MHz) transmits the audio output of the tone generator 28 to the remote FM receiver 16 (up to 150 feet away) where the operator can safely listen to the audible output of the motion detecting radar system 10.

In operation, the motion detecting radar system 10 is typically placed from 1 to 5 feet away from a wall, barrier, or other structure 20 through which moving objects 30 are to be detected. The operator then leaves the immediate area, typically at least 20 feet from the motion detecting radar system 10, in order to allow it to operate at its highest sensitivity. The operator monitors the output of the motion detecting radar system 10 using the remote FM receiver 16. When any motion is present, an audible high pitch tone sounds at the output of the remote FM receiver 16. When no motion is present, there is a very low pitched tone or no sound at all. As a person under surveillance moves around behind the structure 20, the tone switches from high pitch to low pitch in direct relationship to the motion of that person. This tone variation may be used to distinguish the different types of moving objects, such as an animal or wind blown curtains versus motion of a human being.

The motion detecting radar system 10 has an adjustable carrier frequency control implemented by controlling the frequency of the variable tuned oscillator using the controller 29 to optimize operation of the motion detecting radar system 10 and to eliminate any interference from TV stations or other transmitters located in the vicinity. The receiver 13 has adjustable sensitivity controls (short range versus long range) operated by means of the control section to meet the needs of different surveillance operations. The receiver 13 sensitivity adjustment is provided to allow the operator to be closer to the motion detecting radar system 10 and to work with objects located relatively close to the other side of the barrier. A digital meter 31 is provided inside the briefcase to measure battery status and receiver detector output which provides an indication to the operator that the motion detecting radar system 10 is performing properly prior to deployment.

The phase sensitive mixer 21 compares the received signal with the transmitted signal. The output of the phase sensitive mixer 21 is applied to the signal processor 18 in the receiver 13. The signal processor 18 is comprised of the amplifiers 25, the detectors 26, the level shifter 27 and the tone generator 28.

In an embodiment of the present invention that has been reduced to practice, the signal processor 18 and the tone generator 28 are disposed in a small plastic case, and the FM transmitter 14 is mounted in a second small plastic case. The two (6-cell) rechargeable Nicad battery packs are mounted in a third plastic case and form the power source 17. When the motion detecting radar system 10 is transported, the remote FM receiver 16 and battery charger are also packed in the briefcase.

The motion detecting radar system 10 uses a unique technique for measuring the changes in phase difference and the rate of change of phase differences. The receiver 13 captures the total energy reflected from all reflective surfaces within the field of view of the CW antenna 12 and compares that signal with the transmitted CW radar signal in the mixer 21 of the receiver 13. If all reflectors are stationary and the motion detecting radar system 10 is stationary, the total complex phase pattern of the return signal is constant, and therefore a fixed DC output is provided from the mixer 21. Any motion within the total field of view of the CW antenna 12 changes the fixed phase relationship and causes a phase rate of change at the output of the receiver 13. The high gain AC amplifiers 25 amplify these minute DC changes to provide usable signals that are ultimately converted into the audible tones by the tone generator 28.

The phase rate of change is converted into a tone that allows an operator to recognize the motion of an object. The tone is transmitted by way of the 49 MHz FM transmitter 14 to the remote FM receiver 16 for operator monitoring. The output of the FM receiver 16 is almost inaudible when there are no moving objects, but a clear sound alarm is provided when motion is present. The detection process used in the motion detecting radar system 10 is unique in that it captures the minute changes in the complex signal from all reflectors and converts the moving object differences into an audible alarm.

Thus there has been described a new and improved motion detection radar system that is adapted to produce radar warnings signals regarding the presence of moving objects that are located behind structural barriers, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A motion detecting radar system that is adapted to detect motion of a moving object, said system comprising:
   - a frequency tunable continuous wave transmitter comprising a voltage tuned oscillator, an antenna, and a mixer coupled to the voltage tuned oscillator and the antenna;
   - a receiver coupled to the continuous wave transmitter that comprises a signal processor that includes amplifiers adapted to receive output signals from the mixer, detectors coupled to the amplifiers for, a level shifter coupled to the detector for level shifting the detected signal, and a tone generator coupled to the level shifter for generating an audible tone whose frequency is a function of the relative motion of moving objects detected by the system;
   - an FM transmitter comprising an FM antenna coupled to the receiver for transmitting the audible tone indicative of the motion of a moving object; and
   - an FM receiver adapted to receive the audible tone produced by the FM transmitter and reproduce the tone to indicate the presence of moving objects detected by the system.

2. The motion detecting radar system of claim 1 wherein the receiver is adapted to process changes in phase difference and the rate of change of phase differences that are measured by capturing the total energy reflected from all reflective surfaces within the field of view of the CW antenna and comparing that signal with the transmitted CW radar signal in the mixer, and wherein if all reflective surfaces are stationary and the motion detecting radar system is stationary, the total complex phase pattern of the return signal is constant, and a fixed DC output signal is provided from the mixer, and wherein any motion within the total field of view of the CW antenna changes the fixed phase relationship and causes a phase rate of change at the output of the receiver.

3. The motion detecting radar system of claim 1 wherein the phase rate of change is converted into a tone that allows an operator to recognize the motion of the moving object.

4. The motion detecting radar system of claim 1 wherein the CW antenna is a single element, wide band tapered transmission line.

5. The motion detecting radar system of claim 1 wherein the frequency of the variable tuned oscillator is adjustable to provided for adjustable carrier frequency control of the CW transmitter.

6. The motion detecting radar system of claim 1 wherein the receiver further comprises a controller coupled to the amplifier and tone generator and to the voltage tuned oscillator in the transmitter.

7. The motion detecting radar system of claim 1 wherein the FM transmitter comprises an FM transmitter operating at approximately 49 MHz.

* * * * *